United States Patent [19]

Suzuki et al.

[11] 4,253,141

[45] Feb. 24, 1981

[54] PROGRAMMABLE SEQUENCE CONTROLLER WITH COUNTING FUNCTION

[75] Inventors: Isao Suzuki, Okazaki; Toshihiko Yomogida, Kariya; Tsuyoshi Yokota, Okazaki, all of Japan

[73] Assignee: Toyoda-Koki Kabushiki-Kaisha, Kariya, Japan

[21] Appl. No.: 20,048

[22] Filed: Mar. 13, 1979

[30] Foreign Application Priority Data

Mar. 16, 1978 [JP] Japan ................... 53-30250

[51] Int. Cl.³ ............... G06F 7/02; G05B 11/32; G06F 9/06
[52] U.S. Cl. .................... 364/104; 364/200
[58] Field of Search ............... 364/104, 900 MS File

[56] References Cited

U.S. PATENT DOCUMENTS

| 3,909,801 | 9/1975 | Tokura et al. | 364/900 |
| 3,938,104 | 2/1976 | Henry et al. | 364/900 |
| 3,996,565 | 12/1976 | Nakao et al. | 364/900 |
| 4,025,902 | 5/1977 | Nakao et al. | 364/104 |
| 4,029,950 | 6/1977 | Haga | 364/104 |
| 4,048,622 | 9/1977 | Yomogida | 364/900 |
| 4,078,259 | 3/1978 | Soulsby et al. | 364/900 |
| 4,084,237 | 4/1978 | Beachem et al. | 364/104 |
| 4,176,403 | 11/1979 | Suzuki et al. | 364/900 |

OTHER PUBLICATIONS

Texas Instruments: 5T12000 Programmer Operator's Manual, pp. 1-1, 4-45 to 4-50, (1974).

*Primary Examiner*—Felix D. Gruber
*Attorney, Agent, or Firm*—Oblon, Fisher, Spivak, McClelland & Maier

[57] ABSTRACT

A programmable sequence controller with a counting function comprises an addressable latch circuit including at least one flip flop. A counter is connected to the flip flop such that the content of the counter is changed by one each time the flip flop is set. A setting device is provided for manually setting a count-up value of the counter. A comparator generates a count-up value signal when the counting-up of the counter to the count-up value is detected. A data selector is connected to receive the count-up value signal for supplying a logical value indicative of the status of the comparator. A logic operation circuit is responsive to a test command of a first instruction for testing a logical value of one of a plurality of external input devices and the data selector specified by address data in the first instruction and also responsive to an output command in a second instruction for generating an output command signal based upon the result of the test. The flip flop is set in response to the output command signal generated from the logic operation circuit when the flip flop is designated by the address data.

5 Claims, 9 Drawing Figures

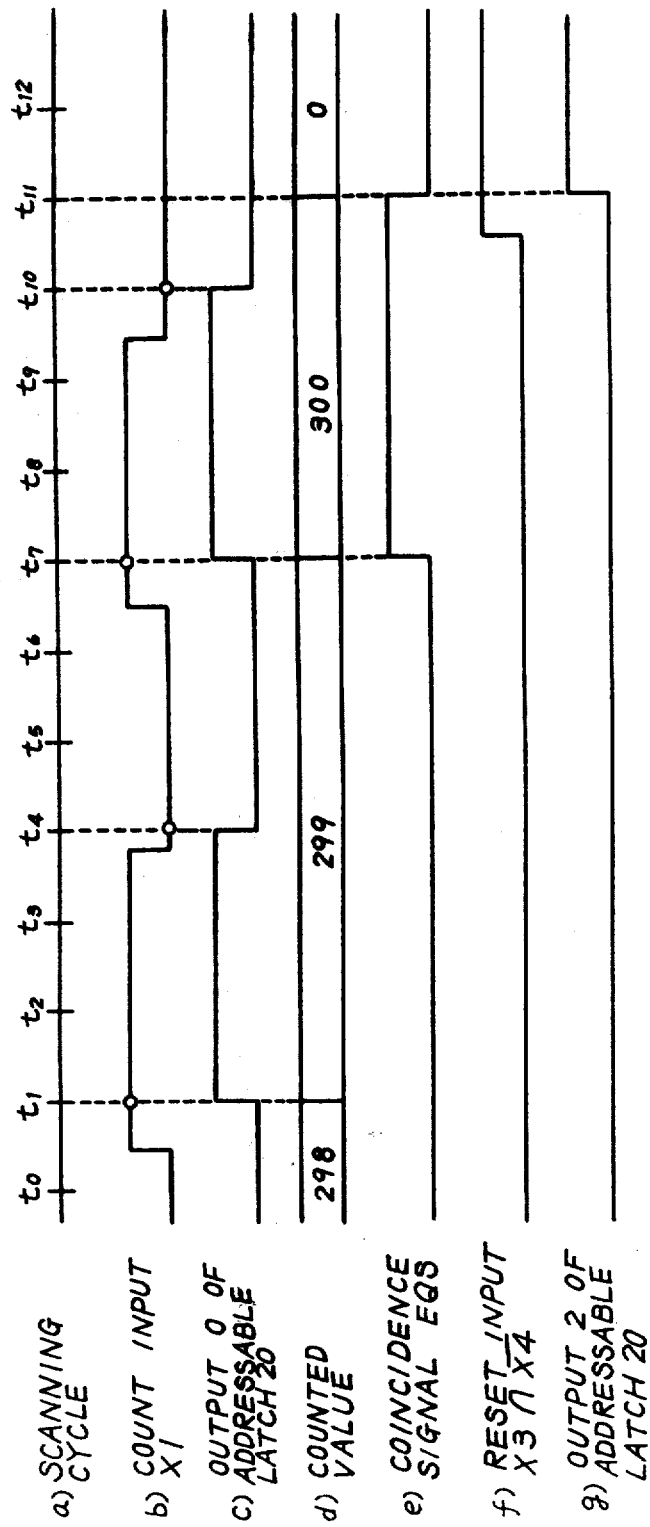

PROGRAMMABLE SEQUENCE CONTROLLER WITH COUNTING FUNCTION

BACKGROUND OF THE INVENTION

1. Field of the Invention

The present invention relates to a programmable sequence controller capable of performing a desired sequence control under direction of a program which is made in accordance with a sequence circuit and written into a memory device.

2. Description of the Prior Art

Recently, it has been required in accordance with the complexity of a sequence control to provide a programmable sequence controller with a counting function that is capable of counting the number of ON-OFF changes in the state of a specified input/output element and detecting whether the counted number coincides with a set value. In order to have such a counting function, it may be necessary to provide a counting command as one of the commands of a sequence program and to enable an operation control device to execute such a counting command. In order to execute the counting command, it is necessary to provide a comparing function as well as an incrementing function to increment the counted value each time a specified input/output element has an ON-OFF change of state. For this reason, it is difficult to give a counting function to the operation control device in the sequence controller of the type which is only designed for executing a logic operation such as a test of an input/output element.

Another type of a programmable sequence controller contains a circuit therein for performing a counting function. However, this type stores the present value of the count of a counter and a set value in a memory, so that a program writing-in device and a special monitoring device have to be used for changing the set value and for monitoring the present value of the count of the counter and the set value. Furthermore, an operator has to memorize the location in the memory where the present value of the count of the counter and the set value are stored. Accordingly, it is difficult to monitor the present value of the count and the set value and to change the set value. The conventional program writing-in device and monitoring device can only represent one word of data stored in the memory, so that it is impossible to simultaneously monitor the present value of the count and the set value or the present values of the counts of a plurality of counters.

SUMMARY OF THE INVENTION

It is therefore an object of the present invention to provide a new and improved programmable sequence controller capable of being provided with a counting function in an easy and reliable manner.

Another object of the present invention is to provide a new and improved programmable sequence controller wherein the setting or change of a count-up value of a counter can be easily made from outside.

Briefly, according to the present invention, these and other objects are achieved by providing a programmable sequence controller, as mentioned below. Memory means stores a sequence of control instructions identified respectively by memory addresses thereof, each of the instructions including a test or output command, and address data. Read-out control means controls the memory means so as to successively read out the control instructions therefrom. An input circuit is operatively connected to a plurality of addressed external input devices for converting states of the external input devices into logical values. An output circuit is operatively connected to a plurality of addressed external output devices to be energized or deenergized. An addressable latch circuit includes at least one flip flop. A counter is connected to the flip flop such that the content of the counter is changed by one each time the flip flop is set. Setting means is provided for manually setting a count-up value of the counter means. Means is provided for comparing the counting-up of the counter to the count-up value set in the setting means and for generating a counting-up signal when the content of the counter coincides with the count-up value set in the setting means. Addressable means is connected to the detecting means to receive the count-up value signal for supplying a logical value indicative of the status of the detecting means. Logic operation means is responsive to the test command of a first instruction for testing a logical value of one of the external input devices and the addressable means specified by the address data of the first instruction and also responsive to the output command of a second instruction for generating an output command signal based upon the result of the test. The output circuit is operable to energize or deenergize one of the addressed external output devices designated by the address data in the second instruction in response to the output command signal from the logic operation means. The flip flop is set in response to the output command signal generated from the logic operation means when the flip flop is designated by the address data in the second instruction.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which:

FIG. 9 is a time chart showing the operation of the counter unit.

DETAILED DESCRIPTION OF THE PREFERRED EMBODIMENT

Figure 1:
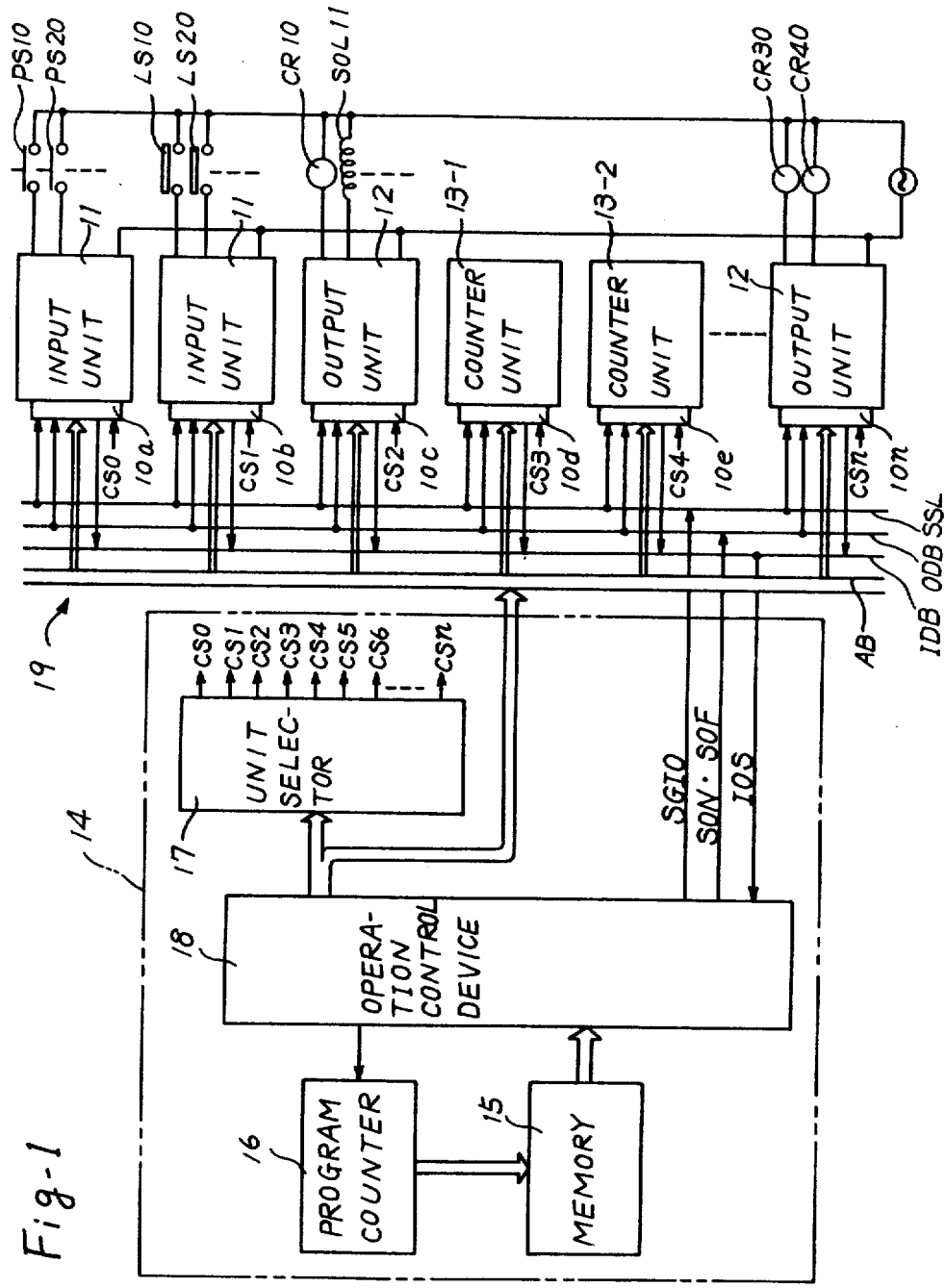
FIG. 1 is a block diagram of a programmable sequence controller according to the present invention.

Referring now to the drawings, wherein like reference numerals or characters refer to identical or corresponding parts throughout the several views, and more particularly to FIG. 1, there is illustrated a constructional outline of a programmable sequence controller according to the present invention, which comprises a control body generally indicated at 14 and an input/output (I/O) section generally indicated at 19. The control body 14 comprises a program memory 15, a program counter 16, a unit selector 17 and an operation control device 18, which will be described later in more detail.

The I/O section 19 comprises a plurality of connectors 10a to 10n, to which input units 11 and output units 12 constituting input circuits and output circuits, respectively, are connected in random order. Each of the input units 11 is connected to input elements such as, for example, push button switches PS10 and PS20 and limit switches LS10 and LS20, whose closed and open states are detected by the input unit 11 for conversion into ON-OFF information signals IOS (e.g. logical values "1" and "0"). Each of the output units 12 is connected to output elements such as a relay CR10 and a solenoid SOL11 and is arranged to energize or deenergize a designated one of the output elements upon receipt of an ON or OFF command signal SON or SOF output from the operation control device 18. Counter units 13 (indicated as 13-1, 13-2, etc.), the number of which is dependent upon the number of counters required for a predetermined sequence control, are also connected to some of the connectors 10a to 10n.

The connectors 10a to 10n are connected to an I/O address bus line AB, an input data bus line IDB, an output data bus line ODB and a strobe signal line SSL in parallel relation with one another and therethrough, further to the operation control device 18. The connectors 10a to 10n are also connected to the unit selector 17 so as to respectively receive unit selection signals CSO to CSn therefrom. The unit selector 17 applies one of the unit selection signals CSO to CSn to the corresponding one of the connectors 10a to 10n when receiving from the operation control device 18 the more significant bits of unit address data, for example, a more significant 5-bit signal in the case where the address data is composed of an 8-bit signal, so that a selection is made of any one of the input units 11, the output units 12 and the counter units 13 which is connected to the designated one of the connectors 10a to 10n.

Figure 2:
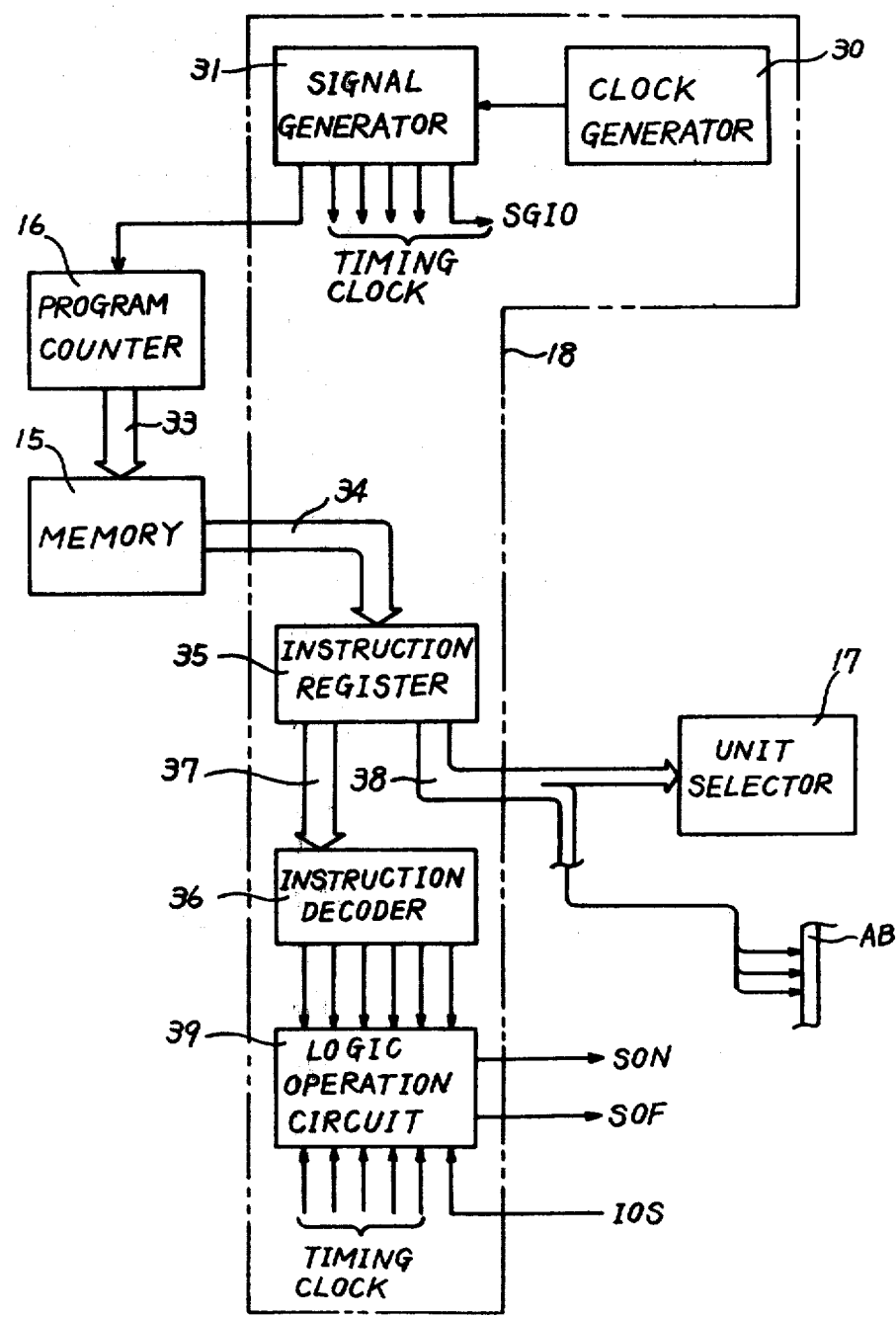
FIG. 2 is a detailed block diagram of an operation control device shown in FIG. 1.

Referring now to FIG. 2, the operation control device 18 is shown in detail as comprising a clock generator 30, which is connected to a signal generator 31 so as to supply thereto a train of clock pulses. The signal generator 31 is arranged in a suitable manner to produce from the clock pulses various timing clocks including a strobe signal SGIO. The strobe signal SG10 is generated in synchronism with the generation of an output command signal SON or SOF from the operation control device 18. The program counter 16 is connected to the signal generator 31 and increments its content each time it receives one of the timing clocks from the signal generator 31. The program counter 16 is also connected to the memory 15 through a memory address bus 33 so as to supply thereto address data for designation of memory addresses. The memory 15 is capable of storing a sequence program composed of a series of program instructions, each of the instructions in turn being composed of an operation command and address data. By way of example, the memory 15 may be a read-only memory wherein each address contains 13 bits of data, and thus, a memory data bus 34 for 13-bit data is used to connect the output terminals of the memory 15 to an instruction register 35. Further, the memory 15, when receiving the address data from the program counter 16, reads out one of the program instructions, designated thereby, for storage in the instruction register 35. By its own nature, the program counter 16 is restored to its initial counting state, namely to a state having its content cleared, after attaining its maximum counting value, so that the reading-out of the program instructions to the register 35 is cyclically executed.

The function of the instruction register 35 is to temporarily store any read-out instruction until a successive instruction is supplied thereto. The register 35 is connected to an instruction decoder 36 through a command bus 3/ suitable for transmission of 5-bit command data to the decoder 36. The decoder 36 decodes the command data into any one of a number of test commands and output commands, referred to later, which are received by a logic operation circuit 39. As easily understood, these commands are distinguished from one another depending upon different combinations between signals (e.g. "1" or "0" in logical representation) which respectively appear on the lines of the command bus 37, and are output from the decoder 36 only one at a time. When the decoder 36 decodes a specified command data combination, one of the output terminals of the decoder 36 corresponding thereto goes high, so that the command is input to the logic operation circuit 39.

The logic operation circuit 39 is connected to the input data bus line IDB so as to receive therefrom the ON-OFF information signal IOS representing the logical status of any selected input or output element. The circuit 39 is also connected to the output data bus lines ODB (shown as a single bus line) in FIG. 1) so as to supply respectively thereto the ON and OFF command signals SON, SOF to energize or deenergize any selected output element. The function of the circuit 39 is to test whether any selected input or output element is in the ON state or in the OFF state by reading the information signal IOS when one of the test commands is applied thereto, to store each of the test results in a register (flip flop), not shown, provided therein and to output the output command signal SON or SOF to any selected output element based upon the test result when one of the output commands is applied thereto. The circuit 39 is more fully described in U.S. Pat. No. 4,048,622 to one of the Applicants of this application, herewith incorporated by reference, and therefore, further description with respect thereto will be omitted for the sake of brevity.

Still in FIG. 2, the instruction register 35 is connected at its output terminal to an address data bus 38, which is separated into the two bundles of data lines: one for transmitting 5-bit unit address data to the unit selector 17 and the other for transmitting 3-bit I/O address data to the I/O address bus AB. When receiving the 5-bit unit address data from the instruction register 35, the unit selector 17 outputs one of the unit selection signals CSO to CSn for selecting one of the input units 11, output units 12 and counter units 13. The 3-bit I/O address data is used for selection of one of the input elements, and the output elements connected to any selected unit.

Figure 3:
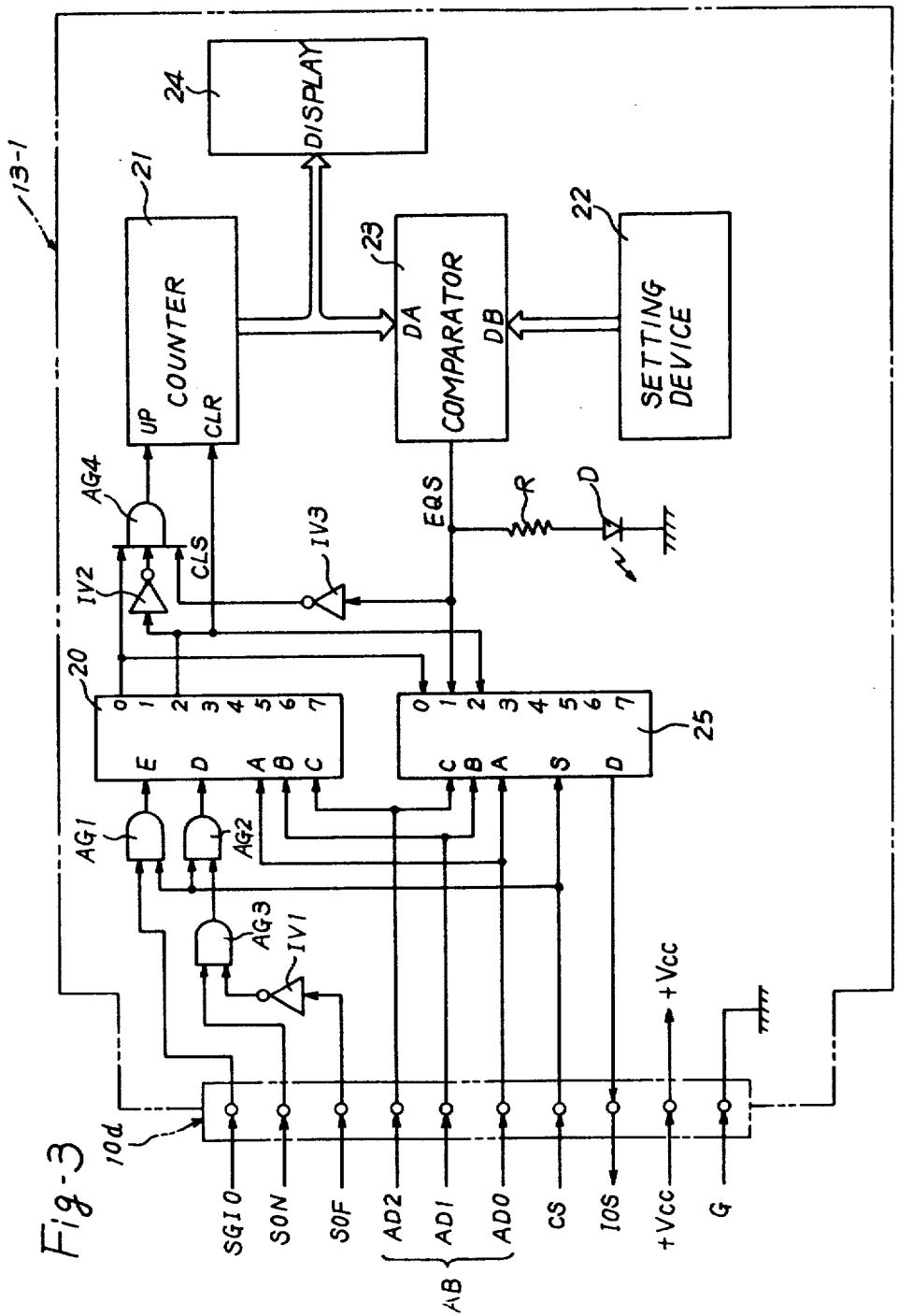
FIG. 3 is a detailed block diagram of a counter unit shown in FIG. 1.
Figure 5:
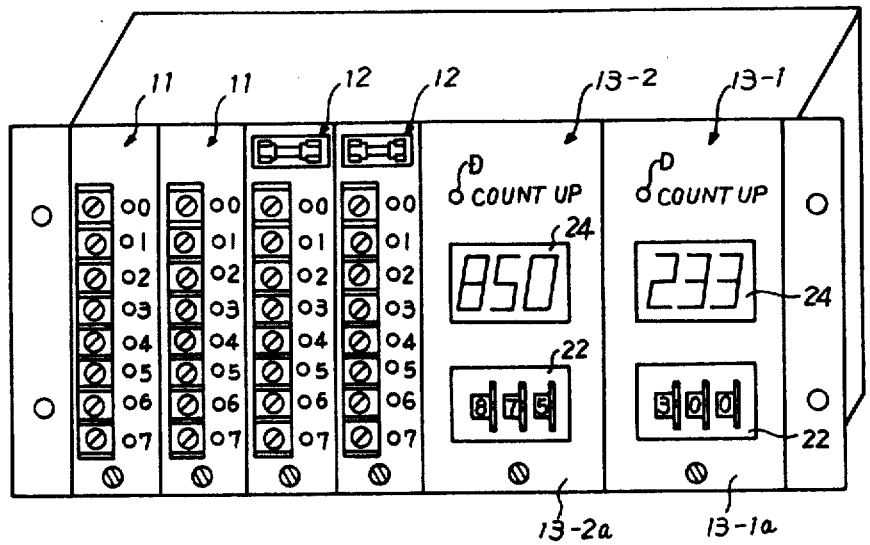
FIG. 5 shows an arrangement of input units, output units and counter units.

FIG. 3 shows the details of the counter unit 13 characterizing the present invention. The counter unit 13-1, for example, comprises an addressable latch circuit 20, a counter 21, a setting device 22 including a digital switch for manually setting a count-up value of the counter 21, a comparator 23 for comparing a value of the count of the counter 21 with the set value of the setting device 22 to detect the counting-up of the counter 21, a display device 24 for displaying a value of the counter 21, a light emitting diode D for indicating the counting-up, a resistance R, a data selector 25, AND gates AG1 to AG4 and inveters IV1 to IV3. The setting device 22, the display device 24 and the light emitting diode D are provided on a front panel 13-1a of the counter unit 13-1 to enable the set value in the setting device 22 to be easily changeable from the outside and to indicate the value of the count and the counting-up of the counter 21, as shown in FIG. 5.

The AND gate AG3 is opened when receiving the ON command signal SON and is closed when receiving the OFF command signal SOF through the inverter IV1. The AND gate AG2 is connected to receive the output of the AND gate AG3 and the unit selection signal CS3. Thus, the gate AG2, when opened, supplies the ON command signal SON to an input terminal D of the latch circuit 20 and, when closed, the OFF command signal SOF to the terminal D. The AND gate AG1 is opened upon receipt of the selection signal CS3 and the strobe signal SGIO from the signal generator 31 so as to apply an enabling signal to an input terminal E of the latch circuit 20.

Figure 4:
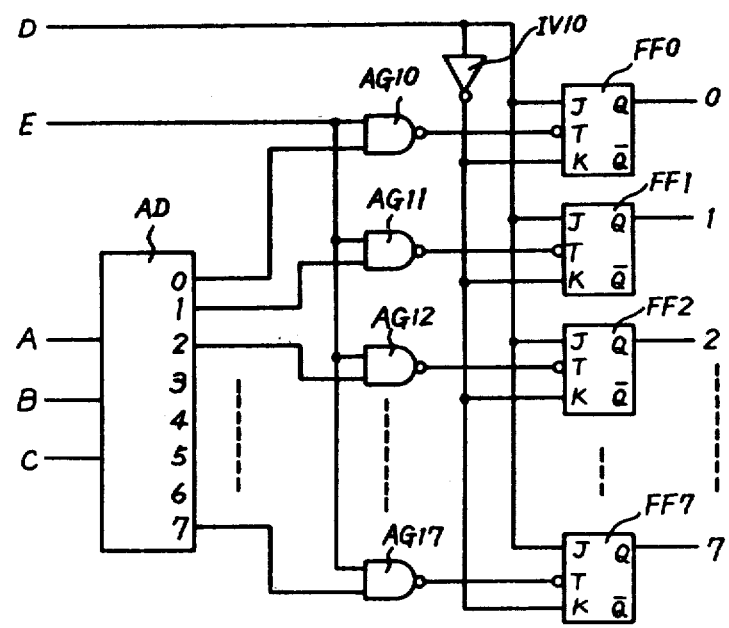
FIG. 4 is a detailed circuit diagram of an addressable latch circuit shown in FIG. 3.

As shown in FIG. 4, the addressable latch circuit 20 comprises eight flip flops FF0 to FF7, an address decoder AD, AND gates AG10 to AG17 and an inverter IV10. The address decoder AD applies a logical ONE signal to one of the AND gates AG10 to AG17 in accordance with the 3-bit I/O address data applied from the I/O address bus AB to its input terminals A, B and C. The AND gates AG10 to AG17 also receive the enabling signal from the input terminal E. Accordingly, one of the AND gates AG10 to AG17 applies a trigger signal to an associated one of the flip flops FF0 to FF7 in accordance with the enabling signal from the input terminal E and the 3-bit I/O address data applied to the address decoder AD. The selected one of the flip flops FF0 to FF7 which is supplied with the trigger signal is set when a logical ONE signal appears on the input terminal D and reset when a logical ZERO signal appears on the input terminal D. The flip flops FF0 to FF7 are connected at the respective output terminals Q to output terminals 0 to 7 of the latch circuit 20. Accordingly, when one of the flip flops FF0 to FF7 is set, the corresponding one of the output terminals 0 to 7 generates a logical ONE signal.

Referring to FIG. 3, the data selector 25 is connected at its address terminals A, B and C to the I/O address bus AB so as to be informed of the I/O address data from the instruction register 35. The data selector 25 is enabled to operate upon receipt at its terminal S of the unit selection signal CS3 which is supplied from the unit selector 17. The data selector 25, when so enabled, selectes one of the ON-OFF information signals IOS being applied to the data input terminals 0 to 7 thereof in accordance with the I/O address data and supplies the selected ON-OFF information from its data output terminal D back to the logic operation circuit 39 through the connector 10d and the input data bus line IDB.

The output terminal 0 of the latch circuit 20 is connected to one input terminal of the AND gate AG4 and to the data input terminal 0 of the data selector 25. The output terminal 2 of the latch circuit 20 is connected to a clear terminal CLR of the counter 21 and the data input terminal 2 of the data selector 25 and to other input terminal of the AND gate AG4 through the inverter IV2. Accordingly, when the flip flop FF2 in the latch circuit 20 is set, the content of the counter 21 is cleared and the AND gate AG4 is closed to stop the increment of the counter 11. The AND gate AG4, when opened, applies a logical ONE signal to an increment terminal UP of the counter 21. The counter 21 increments its content by one when an input signal applied to the terminal UP thereof is changed from logical ZERO to ONE. That is, the content of the counter 21 is incremented when the flip flop FF0 in the latch circuit 20 is changed from a reset state to a set state. The display device 24 is connected to the counter 21 for displaying the value of the count of the counter 21. The comparator 23 compares the content of the counter 21 with the content of the setting device 22. When the content of the counter 21 coincides with the content of the setting device 22, the comparator 23 generates a coincidence signal EQS which is applied to the light emitting diode D through the resistance R for indicating the coincidence. The coincidence signal EQS is also applied to the data input terminal 1 of the data selector 25 and to another input terminal of the AND gate AG4 through the inventer IV3 to close the AND gate AG4. Accordingly, the counting-up of the counter 21 can be detected by testing the status of a signal at the data input terminal 1 of the data selector 25.

The operation of the counter unit 13-1 and its associated sequence program will be now described. It is assumed that the counter 10d is assigned with I/O address number 30 to 37 (in octal representation). That is, the output terminals 0 to 7 of the latch circuit 20 and the data input terminals 0 to 7 of the data selector 25 are respectively assigned with I/O address number 30 to 37.

Figure 6:
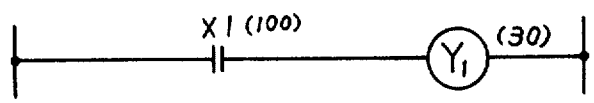
FIGS. 6 to 8 are relay circuits for controlling the counter unit.

FIG. 6 shows a relay circuit for incrementing the content of the counter 21. The program for this relay circuit is shown in TABLE 1.

TABLE 1

| memory address | sequence instruction | meaning |
|---|---|---|
| n | TNA100 | Test whether input element X1 at I/O address 100 is ON |
| n + 1 | YON30 | Energize output element Y1 at I/0 address 30 if test result is satisfied or deenergize it if unsatisfied. |

These instructions are stored in the memory 15, and the operation of the sequence controller is initiated so as to successively read out the instructions being stored in the memory 15. In the course of execution of the program, when the memory address n is designated by the program counter 16, the instruction TNA100 is read out and preset in the instruction register 35. The coded test command TNA of the read-out instruction is applied to the instruction decoder 36, which thus inputs a test command signal TNA to the logic operation circuit 39. On the other hand, the coded I/O address information 100 of the read-out instruction is separated into unit address data and I/O address data, which are then input respectively to the unit selector 17 and the I/O address bus line AB. The unit selector 17 outputs the selection signal CS9 in accordance with the unit address data. The I/O address data represented by "000" in binary code is supplied from the I/O address bus AB to all of the units 11, 12 and 13 through the connectors 10a to 10n. Accordingly, the input element X1 at the I/O address 100 is selected and the ON or OFF information signal IOS of the input element X1 is applied back to the logic operation circuit 39 through the input data bus line IDB. The logic operation circuit 39 then tests whether the input element X1 has been in the ON state by referring to the ON-OFF information signal IOS of the input element X1 supplied thereto in accordance with the test command TNA, and stores the test result in the register (flip flop), not shown, provided therein.

After the test operation, the content of the program counter 16 is incremented to read out the instruction YON30 stored at the memory address n+1 of the memory 15. The coded output command YON is applied to the logic operation circuit 39. The coded I/O address information 30 is separated into unit address data and I/O address data. The unit selector 17 outputs the selection signal CS3 in accordance with the unit address data. The I/O address data reprsented by "000" in binary code is supplied from the I/O address bus AB.

If the test result in the previous operation is satisfied, that is, if the input element X1 at the I/O address 100 was in the ON state, the logic operation circuit 39 generates an output command signal SON in accordance with the output command YON. In accordance with the selection signal CS3 and the output command signal SON, the AND gate AG2 in the counter unit 13-1 shown in FIG. 3 is opened so that a logical ONE signal is applied to the input terminal D of the latch circuit 20. In response to the strobe signal SGIO and the selection signal CS3, the AND gate AG1 in the counter unit 13-1 is opened so that a logical ONE signal is applied to the input terminal E of the latch circuit 20.

In response to the I/O address data represented by "000" in binary code, the address decoder AD in the latch circuit 20 applies a logical ONE signal to the AND gate AG10 so as to open the same in cooperation with the logical ONE signal appearing at the input terminal E. Accordingly, the flip flop FF0 at I/O address 30 in the latch circuit 20 is set in accordance with the signals appearing at the input terminal D and the output terminal of the AND gate AG10, whereby a logical ONE signal is applied from the output terminal 0 of the latch circuit 20. The counter 21 receives a logical ONE signal at its increment terminal UP through the AND gate AG4, to thereby increment its content by one, as shown in FIG. 9.

On the other hand, if the test result in the previous operation is unsatisfied, that is, if the input element X1 was in the OFF state, the flip flop FF0 of the latch circuit 20 in the counter unit 13-1 is maintained reset, whereby the counter 21 is not incremented.

In this manner, the counter 21 increments its content each time the flip flop FF0 is changed from the reset state to the set state. When the content of the counter 21 becomes equal to a value, for example 300, set in the setting device 22, the comparator 23 generates a coincidence signal EQS, whereby the AND gate AG4 is closed to stop the increment of the counter 21 and the light emitting diode D is illuminated to inform an operator of the counting-up.

Figure 7:
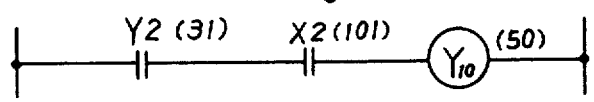

FIG. 7 shows a relay circuit for controlling energization of an output element in accordance with the counting-up of the counter 21. The program for this relay circuit is shown in TABLE 2.

TABLE 2

| memory address | sequence instruction | meaning |
|---|---|---|
| m | TNA31 | Test whether I/O element at I/O address 31 is ON |
| m + 1 | TNA101 | Test whether I/O element at I/O address 101 is ON |
| m + 2 | YON50 | Energize output element at I/O address 50 if test result is satisfied, or deenergize it if unsatis- |

TABLE 2-continued

| memory address | sequence instruction | meaning |
|---|---|---|
| | | fied |

When the instruction TNA31 at the memory address m is read out, the test is executed by the logic operation circuit 39 as to whether I/O element Y2 at I/O address 31 is in the ON state, that is, whether the coincidence signal EQS is generated from the comparator 23 to the input terminal 1 of the data selector 25, which is assigned I/O address 31. The test result is stored in the logic operation circuit 39.

When the instruction TNA 101 at the memory address m+1 is subsequently read out, the test is executed by the logic operation circuit 39 as to whether an input element X2 at I/O address 101 is in the ON state, and the test result is stored in the logic operation circuit 39.

When the instruction YON50 is read out, the logic operation circuit 39 generates the output command signal SON or SOF in accordance with the previous test results. If the test results are satisfied, that is, if the coincidence signal EQS is generated and the input element X2 is in ON state, the output command signal SON is generated to energize the output element Y10 at I/O address 50.

Figure 8:
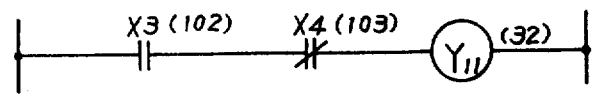

FIG. 8 shows a relay circuit for clearing the content of the counter 21. The program for this relay circuit is shown in TABLE 3.

TABLE 3

| memory address | sequence instruction | meaning |
|---|---|---|
| l | TNA102 | Test whether I/0 element at I/O address 102 is ON |
| l + 1 | TFA103 | Test whether I/O element at I/O address 103 is OFF |
| l + 2 | YON32 | Energize output element at I/O address 32 if test result is satisfied, or deenergize it if unsatisfied |

The ON-OFF status of an input element X3 at I/O address 102 is tested when the sequence instruction TNA102 is read out. Similarly, the ON-OFF status of an input element X4 at I/O address 103 is tested when the sequence instruction TFA103 is read out. When the instruction YON32 is read out, the logic operation circuit 39 generates the output command signal SON or SOF in accordance with the previous test results. If the test results are satisfied, that is, if the input element X3 is in the ON state and the input element X4 is in the OFF state, an output element Y11 at I/O address 32 or the flip flop FF2 of the latch circuit 20 in the counter unit 13-1, which is assigned I/O address 32, is energized or set. When the flip flop FF2 is set, a logical ONE signal is applied to the clear terminal CLR of the counter 21 so that the content of the counter 21 is cleared.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A programmable sequence controller comprising:

memory means for storing a sequence of control instructions identified respectively by memory addresses thereof, each of said instructions including an operation command and address data, wherein said operation commands include test and output commands;

read-out control means for controlling said memory means so as to successively read out said control instructions therefrom;

an input circuit operatively connected to a plurality of addressable external input devices for converting states of said external input devices into logical values;

an output circuit operatively connected to a plurality of addressable external output devices;

an addressable latch circuit including at least one flip flop, said flip flop having a set output terminal;

a counter having a count-up terminal connected to the set output terminal of said flip flop, the content of said counter being changed by one each time said flip flop is set;

setting means for manually setting the count-up value of said counter;

means for comparing the content of said counter with the count-up value set in said setting means and for generating a count-up value signal when the content of said counter coincides with the count-up value set in said setting means;

addressable means connected to said comparing means to receive the count-up value signal for supplying a logical value indicative of the status of said comparing means; and logic operation means connected to said memory means, said input circuit, said addressable means and said output circuit, and responsive to the test command of a first instruction for testing a logical value of one of said external input devices and a logical value of said addressable means specified by the address data of the first instruction, and also responsive to an output command of a second instruction for generating an output command signal based upon the result of the test;

said output circuit being operable to energize or de-energize one of said addressed external output devices designated by the address data in the second instruction in response to said output command signal from said logic operation means; and said flip flop being set in response to said output command signal generated from said logic operation means when said flip flop is designated by the address data in the second instruction.

2. The programmable sequence controller recited in claim 1 including:

display means connected to said counter for displaying the content of said counter.

3. The programmable sequence controller recited in claim 2 including:

a light emitting diode connected to said comparing means to be illuminated when the counting-up is detected.

4. The programmable sequence controller recited in claim 1 including:

an AND gate having a plurality of input terminals and an output terminal, a first input terminal of the AND gate connected to the set output terminal of said flip flop and a second input terminal of the AND gate connected to said comparing means to receive the count-up value signal through an inverter, and the output terminal of the AND gate connected to said counter.

5. The programmable sequence controller recited in claim 4, wherein:

said counter has a clear terminal and said addressable latch circuit includes a second flip flop to be set in response to said output command signal generated from said logic operation means when said second flip flop is designated by the address data, said second flip flop having a set output terminal connected through another inverter to a third input terminal of said AND gate and connected to the clear terminal of said counter.

* * * * *